(12) United States Patent
Bernard et al.

(10) Patent No.: US 10,901,970 B2
(45) Date of Patent: Jan. 26, 2021

(54) ONE-WAY HASHING METHODOLOGY FOR DATABASE RECORDS

(71) Applicant: MASTERCARD INTERNATIONAL INCORPORATED, Purchase, NY (US)

(72) Inventors: Serge Bernard, Danbury, CT (US); Shubhra Srivastava, Scarsdale, NY (US); Loralee Bodo, Mount Kisco, NY (US)

(73) Assignee: Mastercard International Incorporated, Purchase, NY (US)

( * ) Notice: Subject to any disclaimer, the term of this patent is extended or adjusted under 35 U.S.C. 154(b) by 555 days.

(21) Appl. No.: 15/443,965

(22) Filed: Feb. 27, 2017

(65) Prior Publication Data
US 2018/0246889 A1 Aug. 30, 2018

(51) Int. Cl.
G06F 16/22 (2019.01)
G06Q 30/02 (2012.01)
G06F 16/951 (2019.01)
G06F 16/23 (2019.01)
G06F 21/62 (2013.01)
G06F 21/60 (2013.01)
H04L 9/32 (2006.01)

(52) U.S. Cl.
CPC ...... *G06F 16/2255* (2019.01); *G06F 16/2379* (2019.01); *G06F 16/951* (2019.01); *G06F 21/602* (2013.01); *G06F 21/6218* (2013.01); *G06Q 30/0201* (2013.01); *H04L 9/3226* (2013.01)

(58) Field of Classification Search
CPC . G06Q 30/0215; G06F 21/445; G06F 21/602; G06F 21/6218; G06F 16/2255; H04L 9/3226
USPC .......................................... 707/690
See application file for complete search history.

(56) References Cited

U.S. PATENT DOCUMENTS

| | | | |
|---|---|---|---|
| 2014/0032922 A1* | 1/2014 | Spilman | H04L 9/0643 713/184 |
| 2016/0080173 A1* | 3/2016 | Quick | G06Q 30/0202 705/7.31 |
| 2016/0277373 A1* | 9/2016 | Murray | H04L 9/0891 |

* cited by examiner

*Primary Examiner* — Marcin R Filipczyk
(74) *Attorney, Agent, or Firm* — Foley & Lardner LLP

(57) ABSTRACT

Disclosed herein are systems and methods allowing provider server and an analytics server to communicate confidential information but not compromise the anonymity of the customers if the data transmitted in either direction were to be intercepted or otherwise viewed by an unauthorized party, each server is configured to transmit the data records of the customers without any personally identifying information (PII) associated with the customers. The databases may "link" the data records by separately generating customer key identifiers for each unique customer having data in the one or both of the databases, according to predefined parameters and a predetermined one-way hashing algorithm. The unique customer key identifier may then be concatenated to, appended to, or otherwise associated with each data record for a particular customer that is being communicated between the servers.

20 Claims, 2 Drawing Sheets

ONE-WAY HASHING METHODOLOGY FOR DATABASE RECORDS

TECHNICAL FIELD

This application relates generally to dynamically generating and manipulating datasets associated with analytics processing.

BACKGROUND

Online service providers and data analytics services may be collect data about customers through a number of channels. Service providers may desire to receive various analytics information from an analytics service, and thus the parties must communicate data records of their respective databases. But this information is often confidential or sensitive personal information. Moreover, databases are often organized such that personal information is used to associate the data records with the underlying data. This is often problematic where both parties are healthcare, governmental, or financial institutions that are collecting personally identifiable information (PII) of a highly sensitive nature and usually subject to some regulatory obligations for secrecy. What is therefore needed is a way to share information secretly in way that minimizes or eliminates the exposure of customer information when the data is in transit or stored in a database.

Conventional database and networking technologies may encrypt data records when stored or when in transit. But encryption merely hides the data; it does not change the content contained within the underlying data. And although encryption may be a powerful tool for hiding data, encryption does not anonymize the data records or disassociate the content from the identities of customers. If an unauthorized person were to decrypt and access the underlying data, the unauthorized person could plainly see how the data fields in the data records are associated with each customer.

Therefore, what is needed is a means for communicating confidential data that does not maintain an easily recognizable link between personally identifying information (PII) of customers and the data records of those customers, regardless of whether encryption is being used to encrypt the data while the data is in transit or stored.

SUMMARY

Disclosed herein are systems and methods capable of addressing the above-described shortcomings and may also provide any number of additional or alternative benefits and advantages. A system may comprise databases that employ a one-way matching methodology to privately communicate data records or analytics data associated with customers, where a provider database belongs to an online service provider in communication with client devices of customers, and an analytics database belongs to a data analytics service. Each database separately generates unique customer key identifiers (IDs) that are the same in each database for each respective customer, such that the customer key ID is used to uniquely identify data records or analytics data associated with a particular customer. To privately communicate the data records or analytics data, the customer key ID for a customer is appended to any data associated with that customer, such that no identifying information is transmitted in a way that would allow an unauthorized individual to associate private information with particular customers. During or prior to an analytics server performing various analytics on customer data records, the data may be transmitted over any number of networks from the online service provider to the data analytics service. In some cases, the data analytics service may also collect data about customers and generate data records containing the collected customer data. This data from the data analytics service may be used as additional or alternative inputs for the analytics performed by the analytics server. The one-way hashing methodology described herein allows devices of the data analytics service and online service provider to associate data with the appropriate customers. However, due to the hashing process described herein, data-sharing processes do not require the online service provider to send an input file or metadata that expressly associates data records with the customers to the analytics. Instead, because the servers of each party has separately and independently generated the same customer key ID, the devices may send data records or analytics data with the appended customer key ID, which the online service provider or data analytics service may match behind their firewall.

In one embodiment, a computer-implemented method comprises transmitting, by a computer of a first system, to a server of a second system a first key-generation parameter and a second key-generation parameter, wherein the computer of the first system and the server of the second system are each configured to generate a customer key identifier using a predetermined key-generation algorithm and based on the first key-generation parameter and the second key-generation parameter; generating, by the computer, a customer key identifier for a unique customer, for each respective unique customer associated with at least one data record, wherein each customer key identifier is based upon the first key-generation parameter, the second key-generation parameter, and one or more data fields of a first set of one or more data records associated with the respective unique customer, and wherein each respective customer key identifier is identical to the customer key identifier generated for the respective unique customer at the server of the second system; transmitting, by the computer, a second set of data records to the server of the second system in response to an analytics instruction from the server of the second system, each respective data record in the second set of data records associated with at least one unique customer; and concatenating, by the computer, binary data representing the customer key identifier to the binary data representing each respective data record of each unique customer in the second set of data records.

In another embodiment, a computing system comprises a database configured to store a plurality of data records of a plurality of unique customers, wherein a unique customer is associated with one or more data records; and an analytics server comprising a processor configured to: transmit, to a server of a second system, a first key-generation parameter and a second key-generation parameter, wherein the computer of the first system and the server of the second system are each configured to generate a customer key identifier using a predetermined key-generation algorithm and based on the first key-generation parameter and the second key-generation parameter; generate a customer key identifier associated with each unique customer, for each respective unique customer associated with at least one data record in the database, each customer key identifier based upon the first key-generation parameter, the second key-generation parameter, and a data field of one or more data records associated with the respective unique customer, wherein each respective customer key identifier is identical to the customer key identifier generated for the respective unique customer at the server of the second system; transmit a second set of data records to the server of the second system in response to an analytics instruction received from the server of the second system, wherein each respective data record in the second set of data records associated with at least one unique customer; and concatenate binary data representing the customer key identifier to the binary data representing each respective data record of each unique customer in the second set of data records.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
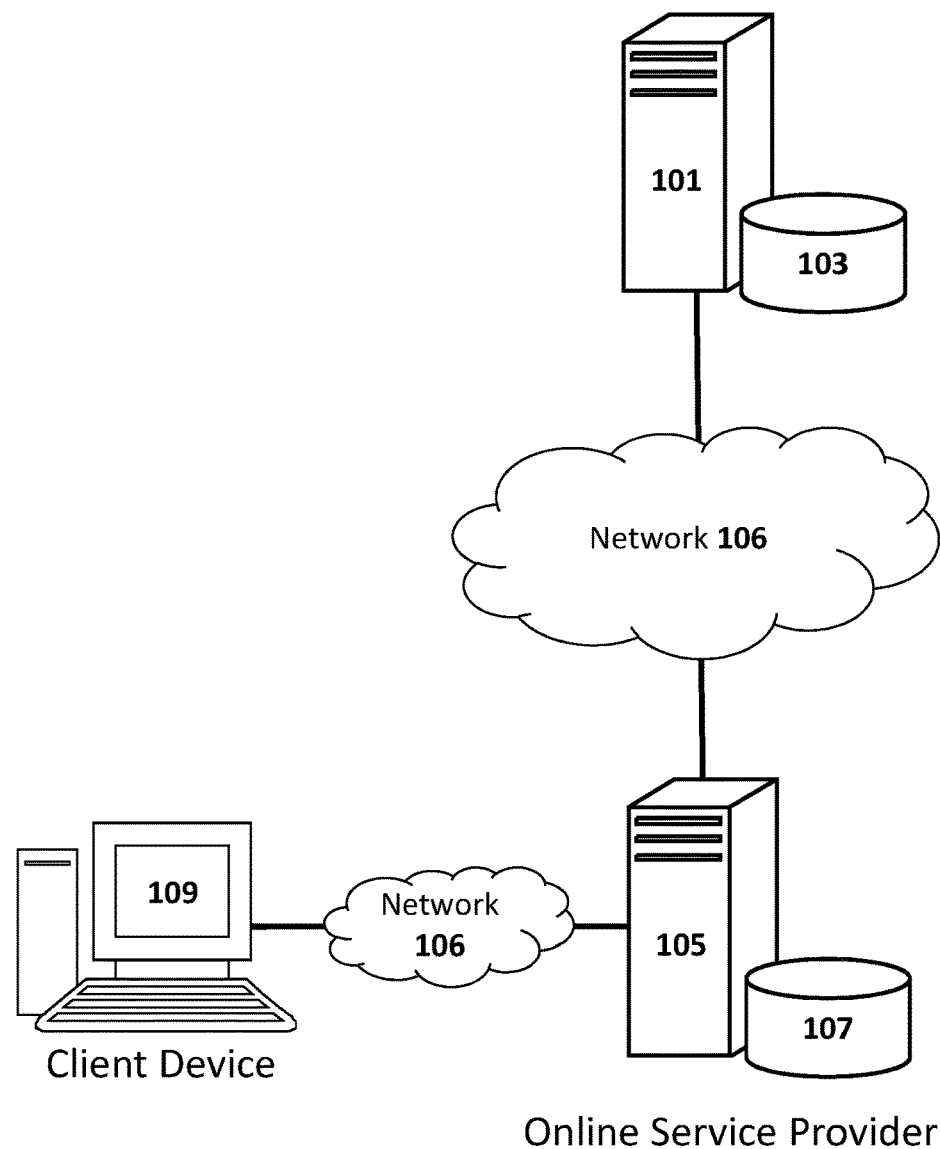
FIG. 1 shows components of an exemplary system, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

In the exemplary embodiments described herein, an online service provider may host a website or transaction network that collects and stores data associated with customers in an online service provider database. A provider server of the online service provider may communicate with an analytics service to perform various analytics. In operation, a provider server of the online service provider may transmit analytics instructions to an analytics server to indicate the type of information desired from the analytics service. An analytics database of the analytics service may receive and store data records received from the provider server; and in some embodiments, the analytics database may separately collect data records about customers, and store the data records into the analytics database. The analytics server may query, fetch, and/or sort data records in the analytics database in accordance with the parameters received in the analytics instructions. The analytics server may then perform a set of analytics algorithms on the particular data records, and then generate and transmit data records back to the provider server containing the information desired by the online service provider.

In order for the provider server and the analytics server to communicate confidential or personal information in a way that would not compromise the anonymity of the customers if the data transmitted in either direction were to be intercepted or otherwise viewed by an unauthorized party, each server is configured to transmit the data records of the customers without any personally identifying information (PII) associated with the customers. The databases may "link" the data records by separately generating a customer key identifier for each unique customer having data in the one or both of the databases, according to predefined parameters and a predetermined one-way hashing algorithm. The unique customer key identifier may then be concatenated to, appended to, or otherwise associated with each data record for a particular customer that is being communicated between the servers.

FIG. 1 shows components of a system 100, according to an exemplary embodiment. The exemplary system 100 comprises an analytics server 101 and an analytics database 103 of a data analytics service, a provider server 105 and a provider database 107 of an online service provider, and a client device 109. The client device 109 may communicate to the provider server 105 via one or more public and/or private networks 106, such as the Internet. Likewise, the provider server 105 may communicate with the analytics server 101 via one or more public and/or private networks 106.

In operation, an online service provider may request that a data analytics service derive various forms of analytical information from data records of the online service provider. To privately communicate data records containing confidential or private data, data records should be anonymized, such that customers cannot be directly associated with any of the particular data entries. An analytics database 103 and a provider database 107 may each store data records that are associated with customer interactions, where the data records each contain at least one field identifying which customer or customer account was associated with the particular interaction. In order for the data records and analytics data to be privately communicated between an analytics server 101 and a provider server 105, the data records are exchanged using a customer key identifier. This customer key identifier may be generated by both the analytics server 101 and the provider server 105 using a predetermined hashing algorithm, and a number of other parameters.

For example, the customer key identifier for a particular customer may be generated by the server 101, 105 using the SHA-256 algorithm, as applied to a set of data records having, for example, the highest values for data records falling within predetermined data range. In some implementations, the servers 101, 105 may provide one or more additional parameters that may be used to generate the customer key identifier. In some instances, the parameters may include a "seed" value, such as a timestamp or random number, that may be incremented or otherwise updated at a predetermined interval. In some instances, the parameters may include a "salt" value that may be provided to the provider server 105 that may be updated at a regular interval. These additional parameters may be applied to some portion of the data records associated with a customer, such that the hashing algorithm may be based upon the additional parameters and one or more data fields of one or more data records of the customer.

An analytics server 101 may perform various analytics on data records stored in an analytics database 103 and transmit the results to a provider server 105, privately and securely. The analytics server 101 may be any computing device comprising a processor capable of performing the various tasks and processes described herein. Non-limiting examples of an analytics server 101 may include a server, desktop, laptop, tablet, and the like. The analytics server 101 comprises any number of computer-networking components (e.g., network interface card) that facilitate inter-device communications via one or more networks 106. One having skill in the art would appreciate that there may be any number of distinct computing devices functioning as the analytics server 101 in a distributed computing environment.

An analytics database 103 may store data records received from an online service provider. The analytics database 103 may be hosted on any number of computing devices comprising a non-transitory machine-readable storage medium capable of storing data records received from a provider server 101, and in some cases, received from client devices 109 or other computing devices (e.g., point-of-sales systems, public websites). The analytics database 103 may further comprise a processor capable of executing various queries and data record management processes according to instructions from an analytics server 101. One having skill in the art would appreciate that the analytics database 103 may be the same computing device as the analytics server 101, or the analytics database 103 may be hosted on a distinct computing device that is in networked-communication with the analytics server 101.

A provider server 105 of an online service provider may communicate data records and instructions to and from an analytics server 101, where the data records may be stored into an analytics database 103 and where various analytics may be performed on the data by the analytics server 101 according to the instructions from the provider server 105. The provider server 105 may be any computing device comprising a processor capable of performing the various tasks and processes described herein. Non-limiting examples of a provider server 105 may include a server, desktop, laptop, tablet, and the like. The provider server 105 comprises any number of computer-networking components (e.g., network interface card) that facilitate inter-device communications via one or more networks 106. One having skill in the art would appreciate that there may be any number of distinct computing devices functioning as the provider server 105 in a distributed computing environment. The provider server 105 may host an online service, such as cloud-computing application service, an online shopping site, a governmental agency, or any other service that provide customer-facing web-based applications that collect customer data through web-based transactions with client devices 109 over one or more networks 106.

A provider database 107 may store data records generated and stored by a provider server 105 during online interactions with client devices 109 when executing the web-application or service accessed by the customer. The provider database 107 may be hosted on any number of computing devices comprising a non-transitory machine-readable storage medium capable of storing data records received from the provider server 105. The provider database 107 may further comprise a processor capable of executing various queries and data record management processes according to instructions from the provider server 105. One having skill in the art would appreciate that the provider database 107 may be the same computing device as the provider server 105, or the provider database 107 may be hosted on a distinct computing device that is in networked-communication with the provider server 105.

A client device 109 may access a web-based service or application hosted by a provider server 105, from which customers may provide various types of personal or confidential data that may be stored into data fields of data records in a provider database 107. In some cases, the data is provided from inputs from the client device 109; and, in some cases, the data is generated by a provider server 105 based on metadata captured from the network traffic from the client device 109 (e.g., device identifier) or data generated based upon the interactions with the client device 109 (e.g., timestamp). It should be appreciated that the client device 109 may be any computing device comprising a processor capable of performing the various tasks and processes described herein. Non-limiting examples of a client device 109 may include a server, desktop, laptop, tablet, and the like. The client device 109 comprises any number of computer-networking components (e.g., network interface card) that facilitate inter-device communications via one or more networks 106.

During execution, the provider server 105 or the analytics server 101 may transmit data records for the customers, without transmitting any personally identifying information that may associate the confidential data records with any particular customer. Each data record may be transmitted such that the customer key identifier is appended to, concatenated to, or otherwise associated with the data records for the particular customer uniquely associated with the particular customer key identifier. Because both servers 101, 105 are pre-configured to perform the same hashing algorithm and use the same parameters, the servers 101, 105 may recognize which customer in the respective databases 103, 107 are associated with which customer key identifier. It should be noted that the servers 101, 105 may be pre-configured to execute the various processes needed to generate the customer key identifiers, and thus the servers 101, 105 may have minimal communication, if any, in order to generate the customer key identifiers. The servers 101, 105 may, for example, be pre-configured to iterate or otherwise apply some shared secret value (e.g., seed value) at some predetermined interval or step of the key-generation process, such that the values will be identical, but the servers 101, 105 did not need to communicate, or communicated minimally, during the key-generation process.

Figure 2:
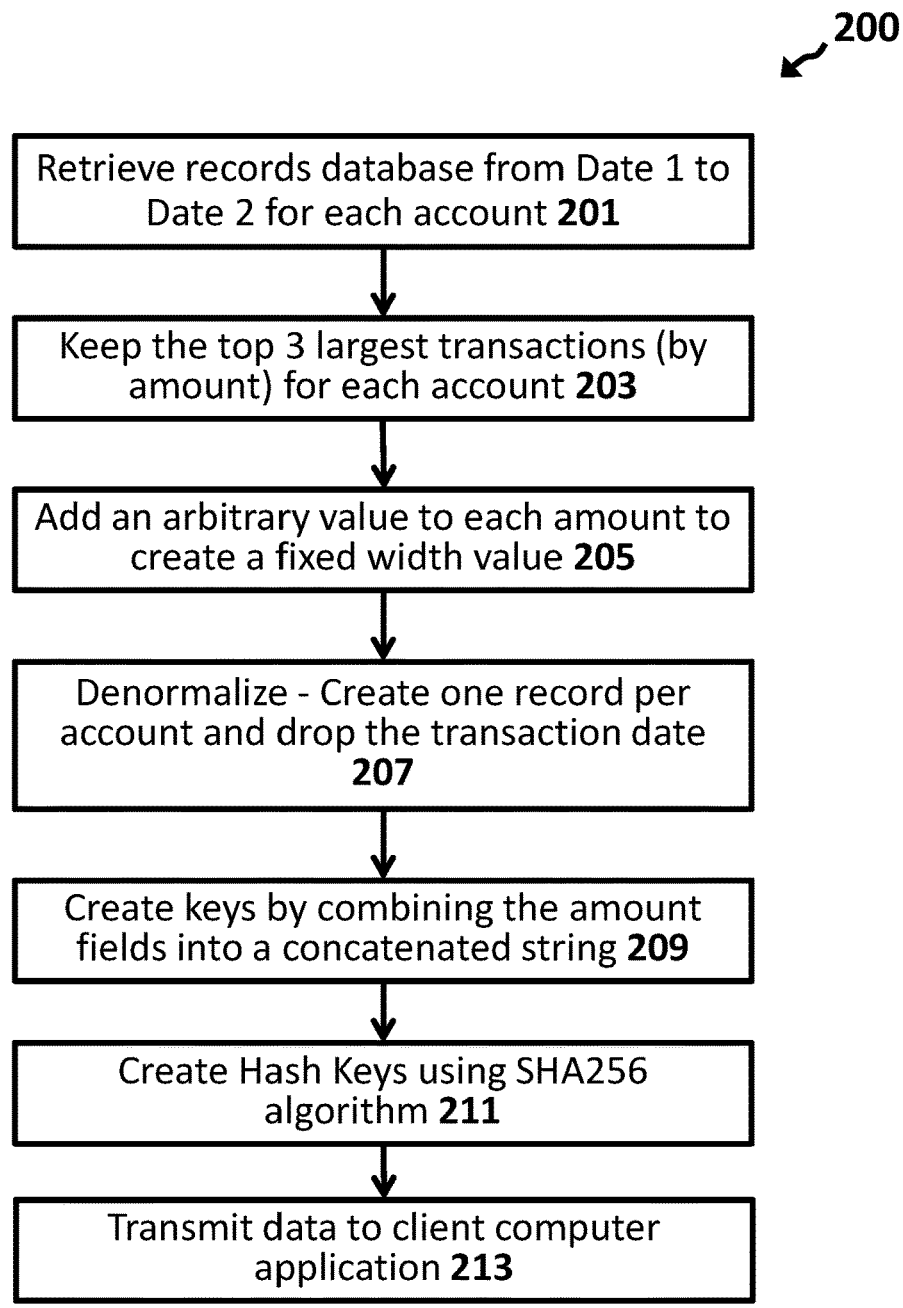
FIG. 2 shows execution of a method of generating a customer key identifier based on a one-way hashing algorithm, when dynamically generating datasets and conducting analytics, according to an embodiment.

FIG. 2 shows execution of a method 200 generating a customer key identifier based on a one-way hashing algorithm, when dynamically generating datasets and conducting analytics, according to an exemplary embodiment. The exemplary method 200 shown in FIG. 2 comprises execution steps 201, 203, 205, 207, 209, 211, and 213. However, it should be appreciated that other embodiments may comprise additional or alternative execution steps, or may omit one or more steps altogether. It should also be appreciated that other embodiments may perform certain execution steps in a different order, simultaneously, or near-simultaneously. Furthermore, in the exemplary method 200, entities are described as merchants and competitors within a market, but it should be appreciated that these terms are merely exemplary and that entities may refer to any number of people or organizations.

In a first step 201, an analytics server and a provider server may retrieve a set of data records from a database storing data records having data fields, according to predetermined query parameters. In the exemplary method 200, the analytics server may query the analytics database for records having data fields containing date values that satisfy the query parameters. The analytics server may query an analytics database storing a set of data records associated with customers of an online service provider. In this embodiment, each server may be configured to retrieve and sort a set of data records for two customers within a given date range.

Table 1 shows a table of records queried and sorted by the servers from the respective provider database and analytics database. In this example, there are three data fields: a customer identifier (ID) field, a date field, and a value field that may represent any type of data value or string.

TABLE 1

| Cust. ID | Date | Value |
| --- | --- | --- |
| A | 2015 Jul. 18 | 34.69 |
| A | 2015 Jul. 5 | 8.53 |
| A | 2015 Jun. 10 | 11.69 |
| A | 2015 May 10 | 112.69 |
| B | 2015 Jul. 19 | 462.07 |
| B | 2015 Jun. 5 | 412.14 |
| B | 2015 May 28 | 523.30 |
| B | 2015 May 15 | 52.30 |

In a next step 203, the analytics server and the provider server may keep the top three largest values in the value field (e.g., transaction amount field), for each customer identifier in a customer identifier field (e.g., account no.).

Table 2 shows the data records for the two customers, where the three data records having the largest value were maintained, and the where the data record with the respectively lowest value was discarded.

TABLE 2

| Cust. ID | Date | Value |
| --- | --- | --- |
| A | 2015 May 10 | 112.69 |
| A | 2015 Jul. 18 | 34.69 |
| A | 2015 Jun. 10 | 11.69 |
| B | 2015 May 28 | 523.30 |
| B | 2015 Jul. 19 | 462.07 |
| B | 2015 Jun. 5 | 412.14 |

In a next step 205, the analytics server and the provider server may add an arbitrary value to each amount to create a fixed width value. In some embodiments, the value may be updated by any number of additional or alternative parameters (e.g., seed value, salt value), which may be iterative or dynamic according to a predetermine algorithm.

Table 3 shows the data records of the two customers, where the value of 10000 is automatically added by each of the analytics server and the provider server to the respective data records of each server.

TABLE 3

| Cust. ID | Date | Value |
| --- | --- | --- |
| A | 2015 May 10 | 100112.69 |
| A | 2015 Jul. 18 | 100034.69 |
| A | 2015 Jun. 10 | 100011.69 |
| B | 2015 May 28 | 100523.30 |
| B | 2015 Jul. 19 | 100462.07 |
| B | 2015 Jun. 5 | 100412.14 |

In a next step 207, the analytics server and the provider server may create one temporary data record per customer that comprises a field for each data record kept by the servers, and then drops superfluous data fields, thereby "denormalizing" the data records, and further disassociating the information from actual underlying data.

Table 4 shows two data records—one for each unique customer ID. The data records comprise values one, two, and three, which were taken from the data records queried and parsed from the respective databases.

TABLE 4

| Cust. ID | Value 1 | Value 2 | Value 3 |
| --- | --- | --- | --- |
| A | 100112.69 | 100034.69 | 100011.69 |
| B | 100523.30 | 100462.07 | 100412.14 |

In a next step 209, the analytics server and the provider server may create keys by combining the amount fields into a concatenated string. In some embodiments, the keys may be used as database keys or reference fields to uniquely identify the customer, rather than using the customer ID data field, which may contain personally identifying information.

Table 5 shows the two unique keys generated for each of the customer IDs. The customer DB key may be the result of concatenating or otherwise appending the values remaining from applying the one or more parameters from the parsed data records.

TABLE 5

| Cust. ID | DB Key |
| --- | --- |
| A | 100112.69100034.69100011.69 |
| B | 100523.30100462.07100412.14 |

In a next step 211, the analytics server and the provider server may create hash keys using a hashing algorithm, such as the SHA-256 algorithm. The algorithm may be applied against the customer DB key that was generated in a previous step 209, such that the underlying data cannot be determined or retroactively identified or discerned through cryptanalysis.

Table 6 shows the resulting customer identifier key that is associated with each unique customer ID, and thus uniquely associated with each unique customer having a data record in the respective databases.

TABLE 6

| Cust. ID | Customer Identifier Key |
| --- | --- |
| A | 88f5bf1c2949e9d3c7b82916da80680992da3838024dbd2a129eec16823cb330 |
| B | 67f5tf1c2949e9d3c7b82916da80680992da3838024dbd2a129eec16823cb543 |

In a next step 213, the analytics server and the provider server may communicate data records having values, but without communicating any personally identifiable information. For example, the analytics server may complete an analytics algorithm on data records as requested by the online service provider, to derive some average values or other information from the customer behaviors of the online service provider. When returning the values and responses to the provider server of the online service provider, the analytics server may concatenate to, append to, or otherwise associate with the resulting analytics values, the customer identifier key generated for the respective customer. In some instances, the analytics server may provide analytics data that is organized according to the data values of individual customers, as in Table 7. And in some instances, the analytics server may provide a listing of customer identifier keys that satisfy a set of query parameters received from the provider server. As an example, the provider server may request a listing of customers who, based on data records, may be interested in a particular election candidate, may live in a particular region, or may have certain purchasing habits. The analytics server may then return a listing of customer identifier keys that will be recognizable to the provider server, as the provider server is aware of the hashing algorithm applied to generate the customer identifier keys.

TABLE 7

| Value 1 | Value 2 | Customer Identifier Key |
|---|---|---|
| 41.9 | 3 | 88f5bf1c2949e9d3c7b82916da80680992da3838024dbd2a129eec16823cb330 |
| 362.4 | 3 | 67f5tf1c2949e9d3c7b82916da80680992da3838024dbd2a129eec16823cb543 |

Additionally or alternatively, in some embodiments, the customer identifier key may be used to hash the data being communicated between the servers, such that the customer identifier key may function as an encryption key for the data records of that particular customer. The customer identifier key may then be used to decrypt the data and associate the data with the appropriate data records for that customer and satisfying the analytics instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:
1. A computer-implemented method comprising:
transmitting, by a computer of a first system, to a server of a second system a first key-generation parameter and a second key-generation parameter,
wherein the server of the second system is configured to generate a first customer key identifier for a unique customer using a predetermined key-generation algorithm and based on the first key-generation parameter and the second key-generation parameter;

generating, by the computer, a second customer key identifier for the unique customer using the predetermined key-generation algorithm utilizing a one-way hashing protocol and based upon the first key-generation parameter, the second key-generation parameter, and one or more data fields of a first set of one or more data records associated with the unique customer, wherein a value of the second customer key identifier generated for the unique customer at the computer of the first system based on execution of the predetermined key-generation algorithm is identical to a value of the first customer key identifier generated for the unique customer at the server of the second system based on execution of the predetermined key-generation algorithm;

transmitting, by the computer, a second set of data records to the server of the second system in response to an analytics instruction from the server of the second system, each respective data record in the second set of data records associated with at least the unique customer;

wherein the second set of data records includes the second customer key identifier concatenated to binary data representing each respective data record of the unique customer in the second set of data records; and in response to decrypting, by the server, the second set of data records using the first customer key identifier, attributing, by the server, each respective data record in the second set of data records to the unique customer based upon a match between the first and second customer key identifiers.

2. The method according to claim 1, further comprising receiving, by the computer of a first system, from one or more servers of the second system, a first set of data records containing the data fields associated with one or more unique customers respectively.

3. The method according to claim 1, wherein the computer receives each respective data record in the first set of data records as a batch transfer from the server of the second system.

4. The method according to claim 1, wherein the computer receives each respective data record in real-time at a time of a interaction between the server of the second system and a client device.

5. The method according to claim 1, further comprising receiving, by the computer, from one or more payment devices a first set of data records containing the data fields associated with one or more unique customer respectively.

6. The method according to claim 1, wherein generating the customer key identifier further comprises:
identifying, by the computer, one or more data records associated in the first set of data records satisfying a set of query parameters; and
updating, by the computer, one or more values in one or more data fields by a predetermined amount.

7. The method according to claim 6, wherein generating the customer key identifier further comprises:
generating, by the computer, each customer key identifier using a hashing algorithm and based upon: the value of the data field of each of the one or more data fields, the first key-generation value, and the second key-generation algorithm.

8. The method according to claim 1, wherein the first key-generation value is a seed value that each of the computer of the first system and the server of the second system updates at a predetermined interval according to a predetermined algorithm.

9. The method according to claim 1, wherein the first key-generation value is a salt value that the computer of the first system transmits to the server of the second system according to a predetermined algorithm.

10. The method according to claim 1, wherein transmitting the second set of data records further comprises:
executing, by the computer, an analytics algorithm on a subset of set of data records satisfying a set of query parameters according to the analytics instruction from the server of the second system; and
generating, by the computer, the second set of data records containing the subset of data records having a set of values generated upon executing the analytics algorithm.

11. A system comprising:
a database configured to store a plurality of data records of a plurality of unique customers, wherein a unique customer is associated with one or more data records; and
an analytics server comprising a hardware processor in communication with a memory, the analytics server configured to:
transmit, to a provider server, a first key-generation parameter and a second key-generation parameter, and
generate a first customer key identifier for the unique customer using a predetermined key-generation algorithm utilizing a one-way hashing protocol and based on the first key-generation parameter, the second key-generation parameter, and a data field of a first set of one or more data records associated with the unique customer, wherein the provider server is configured to:
generate a second customer key identifier associated with the unique customer, the second customer key identifier using the predetermined key-generation algorithm based upon the first key-generation parameter and the second key-generation parameter, wherein a value of the second customer key identifier generated at the provider server based on execution of the predetermined key-generation algorithm is identical to a value of the first customer key identifier generated for the unique customer at the analytics server based on the execution of the predetermined key-generation algorithm; and
transmit a second set of data records to the analytics server in response to an analytics instruction received from the analytics server, wherein each respective data record in the second set of data records associated with at least the unique customer;
wherein the second set of data records includes the second customer key identifier concatenated to binary data representing each respective data record of the unique customer in the second set of data records, and
wherein in response to decrypting the second set of data records using the first customer key identifier, the analytics server is configured to attribute each respective data record in the second set of data records to the unique customer based upon a match between the first and second customer key identifiers.

12. The system according to claim 11, wherein the analytics server is further configured to receive from one or more servers of the second system, a first set of data records containing the data fields associated with one or more unique customers respectively.

13. The system according to claim 11, wherein the analytics server receives each respective data record in the first set of data records as a batch transfer from the server of the second system.

14. The system according to claim 11, wherein the analytics server receives each respective data record in real-time at a time of a interaction between the server of the second system and a client device.

15. The system according to claim 11, wherein the analytics server is further configured to receive from one or more payment devices a first set of data records containing the data fields associated with one or more unique customer respectively.

16. The system according to claim 11, wherein when generating the customer key identifier, the analytics server is further configured to:
   identify one or more data records associated in the first set of data records satisfying a set of query parameters; and
   update one or more values in one or more data fields by a predetermined amount.

17. The system according to claim 16, wherein when generating the customer key identifier the analytics server is further configured to:
   generating, by the computer, each customer key identifier using a hashing algorithm and based upon: the value of the data field of each of the one or more data fields, the first key-generation value, and the second key-generation algorithm.

18. The system according to claim 11, wherein the first key-generation value is a seed value that each of the analytics server and the server of the second system updates at a predetermined interval according to a predetermined algorithm.

19. The system according to claim 11, wherein the first key-generation value is a salt value that the analytics server transmits to the server of the second system according to a predetermined algorithm.

20. The system according to claim 11, wherein when transmitting the second set of data records, the analytics server is further configured to:
   execute an analytics algorithm on a subset of set of data records satisfying a set of query parameters according to the analytics instruction from the server of the second system; and
   generate the second set of data records containing the subset of data records having a set of values generated upon executing the analytics algorithm.

* * * * *